US009901071B2

(12) United States Patent
Van Der Sluis

(10) Patent No.: US 9,901,071 B2
(45) Date of Patent: Feb. 27, 2018

(54) MILKING BOX AND COW STABLE COMPRISING SUCH A MILKING BOX

(71) Applicant: Technologies Holdings Corporation, Houston, TX (US)

(72) Inventor: Peter Willem Van Der Sluis, Usselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 428 days.

(21) Appl. No.: 14/100,796

(22) Filed: Dec. 9, 2013

(65) Prior Publication Data

US 2014/0158051 A1   Jun. 12, 2014

Related U.S. Application Data

(63) Continuation of application No. 13/588,770, filed on Aug. 17, 2012, now Pat. No. 8,601,979, which is a (Continued)

(30) Foreign Application Priority Data

Feb. 19, 2010   (NL) ..................... 2004272

(51) Int. Cl.
*A01K 1/12*   (2006.01)
*A01K 1/00*   (2006.01)

(52) U.S. Cl.
CPC .............. *A01K 1/12* (2013.01); *A01K 1/0017* (2013.01)

(58) Field of Classification Search
CPC ........ A01K 1/126; A01K 1/12; A01K 1/0017; A01K 1/0005; A01K 1/0011; A01K 1/0023; A01K 1/0029; A01K 1/00
(Continued)

(56) References Cited

U.S. PATENT DOCUMENTS 4,617,876 A * 10/1986 Hayes .................. A01K 1/0023
                                                        119/51.02
6,213,058 B1 * 4/2001 Byl ...................... A01K 1/0613
                                                        119/843
(Continued)

FOREIGN PATENT DOCUMENTS

| EP | 1316253 A2 * | 6/2003 | ............... A01K 1/12 |
|---|---|---|---|
| WO | WO 2005/112613 | 5/2005 | |
| WO | WO 2008/039150 | 9/2007 | |

OTHER PUBLICATIONS

Australian Patent Examination Report No. 1; Patent Application No. 2011216592;4 pages, dated Jul. 9, 2015.
(Continued)

*Primary Examiner* — Joshua D Huson
(74) *Attorney, Agent, or Firm* — Baker Botts L.L.P.

(57) ABSTRACT

Milking box or boxes for cows, each milking box having two entrance fences for entry and two exit fences, wherein one first entrance fence and one first exit fence form a first pair of fences positioned at a first side, and one second entrance fence and one second exit fence form a second pair of fences at a second side which is opposite the first side. This type of milking box used in a cow stable further comprises resting boxes, at least one feeder trough, a separation zone or zones, and walking paths, wherein at least the resting boxes are placed at the first side of the milking box or boxes, and that at the second side of the milking box or boxes at least one is placed selected from the group comprising at least one feeder trough, a separation zone or zones, or outdoors.

20 Claims, 9 Drawing Sheets

Related U.S. Application Data continuation of application No. PCT/NL2011/050111, filed on Feb. 17, 2011.

(58) Field of Classification Search
USPC .............................................. 119/14.03, 520
See application file for complete search history.

(56) References Cited

U.S. PATENT DOCUMENTS

| | | | | |
|---|---|---|---|---|
| 2008/0017118 A1* | 1/2008 | Wigholm | ................. | A01K 1/12 119/14.03 |
| 2010/0096466 A1* | 4/2010 | Ehrlemark | ........... | A01K 1/0047 236/49.3 |

OTHER PUBLICATIONS

EPO Communication, Application No. 13190474.0-1655 / 2700303; and Search Report, 7 pages, dated Jun. 17, 2015.
Australian Government IP Australia Patent Examination Report No. 1; Patent Application No. 2015234388; 3 pages, dated Dec. 16, 2016.
EPO Communication, Application No. 16020512.6-1655, 8 pages, dated Mar. 10, 2017.
EPO Communication, Application No. 16020511.8-1655, 7 pages, dated Mar. 10, 2017.
EPO Communication, Application No. 16020510.0-1655, 8 pages, dated Mar. 10, 2017.
Australian Government IP Australia Patent Examination Report No. 2 for Standard Patent Application; Patent Application No. 2015234388; 10 pages, Jan. 30, 2017.

\* cited by examiner

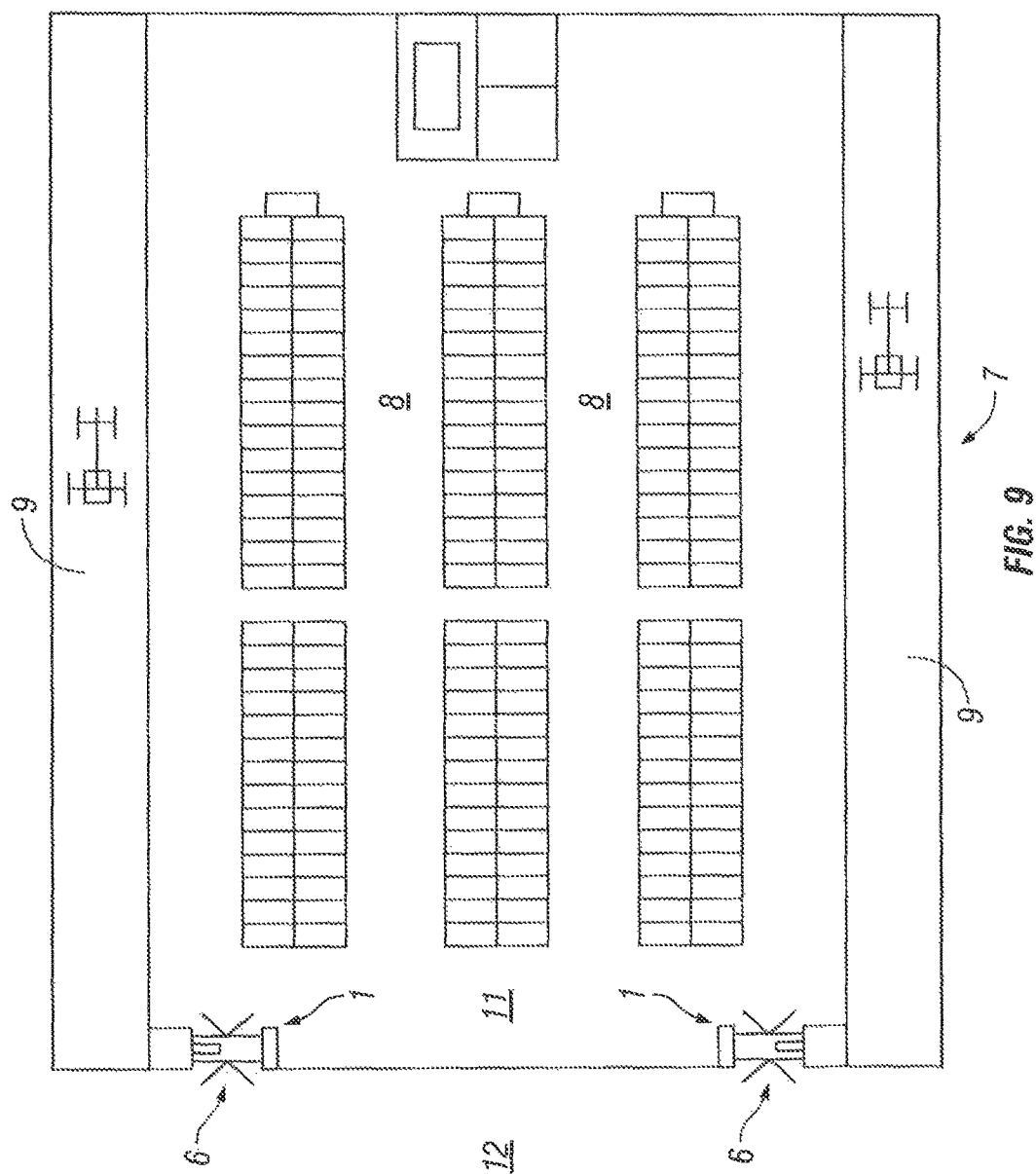

MILKING BOX AND COW STABLE COMPRISING SUCH A MILKING BOX

CROSS-REFERENCE TO RELATED APPLICATIONS

This application is a continuation of U.S. application Ser. No. 13/588,770 which is now U.S. Pat. No. 8,601,979 issued Dec. 10, 2013, and entitled "MILKING BOX AND COW STABLE COMPRISING SUCH A MILKING BOX", which is a continuation application of International Patent Application Serial No. PCT/NL2011/050111, entitled "Milking Box and Cow Stable Comprising Such a Milking Box" to Rotech Special Projects B.V. filed on Feb. 17, 2011, which is a continuation of Netherlands Patent Application Serial No. 2004272, entitled Milking Box and Cow Stable Comprising Such a Milking Box," filed on Feb. 19, 2010 and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The invention relates to a milking box for cows, comprising at least at one of its sides an entrance fence for entry of a cow and an exit fence for exiting a cow after it being milked. The invention is also concerned with a cow stable comprising resting boxes for cows, milking boxes, at least one feeder trough, a separation zone or zones, and walking paths allowing the cows to move between the resting boxes, milking boxes, the at least one feeder trough and the separation zone or zones.

Description of Related Art

Milking box or boxes are well known in the art and are conventionally placed in the middle or at one of the sides of the cow stable. Whenever a cow in the stable needs to be milked, the cow moves to the milking box at which the cow will be milked manually, semi-automatically, or automatically. When the milking operation has been completed the cow leaves the milking box at the same side as it entered, and either returns to its resting box, or moves to the feeding trough. Occasionally the cow can be separated, for instance if the milking operation was unsatisfactory, or when the cow is recognized (by automatic recognition means) as being nominated for a checkup.

One of the problems with existing cow stables is that it requires quite complicated fencing to have a cow move from the milking box to a separation zone.

Another problem with prior art cow stables is that the cows and people that need to work in the stable share the same room, which is not always desirable.

Still another problem with prior art cow stables is that it requires quite some labor to secure that each cow is moved from a first position within or outside the cow stable to a second position within or outside the cow stable.

BRIEF SUMMARY OF THE INVENTION

It is an object of the invention to alleviate or remove one or more of the above-mentioned problems that pertain to the cow stable of the prior art.

According to the invention a milking box and a cow stable are proposed in accordance with the appended claims.

BRIEF DESCRIPTION OF THE SEVERAL VIEWS OF THE DRAWINGS

The invention will hereinafter be further elucidated with reference to the drawing.

In the drawings:

FIG. 6-FIG. 9 show several embodiments of the cow stable of the invention.

Wherever in the figures the same reference numerals are applied, these numerals refer to the same parts.

DESCRIPTION OF THE INVENTION

The milking box of the invention has two entrance fences and two exit fences, wherein one first entrance fence and one first exit fence form a first pair of fences positioned at a first side, and one second entrance fence and one second exit fence form a second pair of fences that is positioned at a second side which is opposite to the first side.

In accordance with the invention the cow stable that is implemented with such a milking box or milking boxes, is arranged such that at least the resting boxes are placed at the first side of the milking box or boxes, and that at the second side of the milking box or boxes at least one is placed that is selected from the group comprising at least one feeder trough, a separation zone or zones, outdoors. The milking box of the invention thus provides the possibility that the movement of the individual cows can be controlled and that accurate track can be kept of each individual cow that has been milked. It is also possible to regulate the movement of the cows between indoors and outdoors of the cow stable, and between different parts within the cow stable.

DETAILED DESCRIPTION OF THE INVENTION

Figure 1:
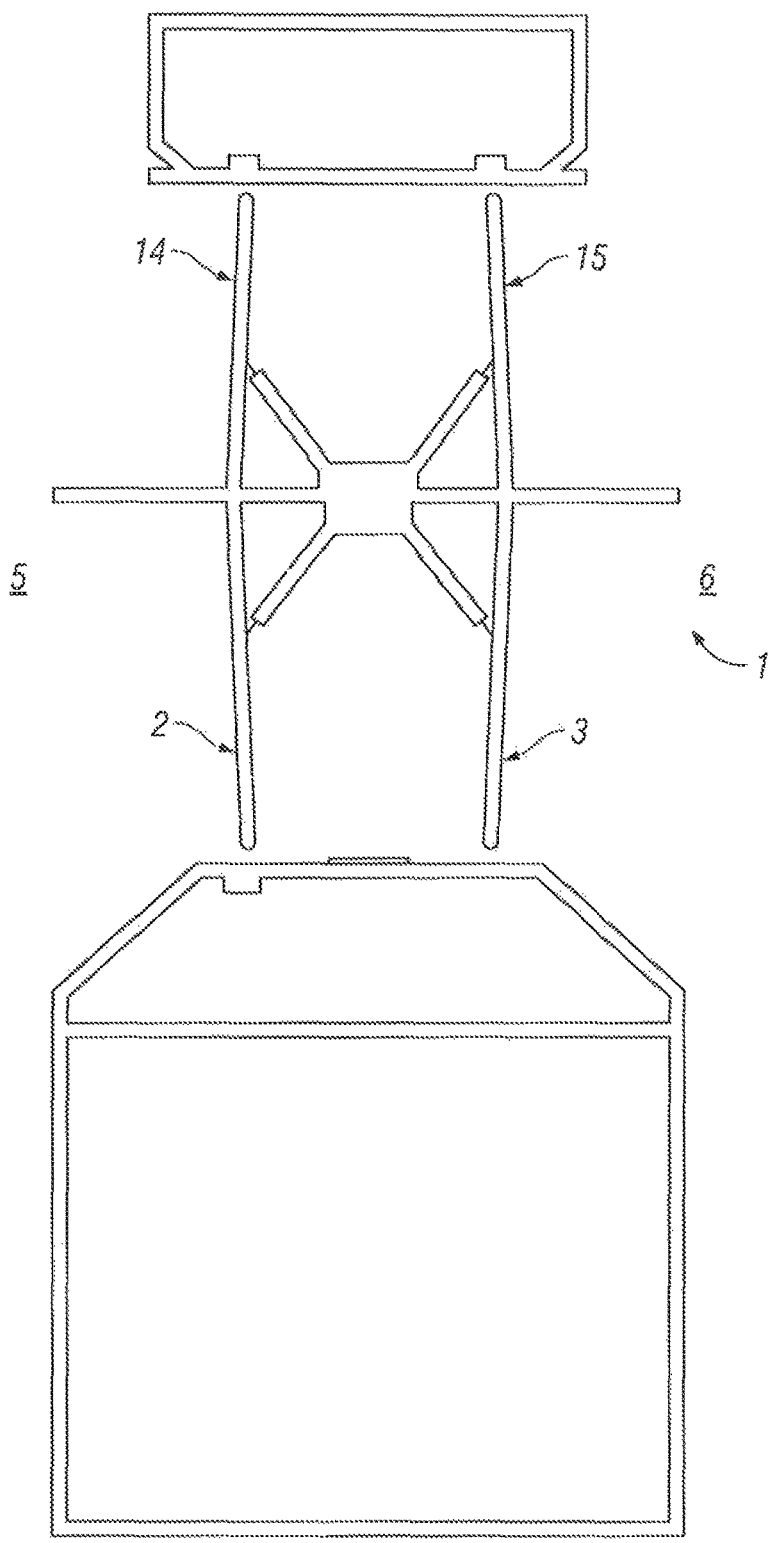
FIG. 1-FIG. 5 show several operational positions of the milk box of the invention.

Referring first to FIG. 1 a milking box 1 for cows is shown, having two entrance fences 2, 3 for entry of a cow and two exit fences 14, 15 for exiting a cow after it being milked. In this milking box 1 one first entrance fence 2 and one first exit fence 14 form a first pair of fences 2, 14 positioned at a first side 5, and one second entrance fence 3 and one second exit fence 15 form a second pair of fences 3, 15 that is positioned at a second side 6 which is opposite to the first side 5.

Figure 2:
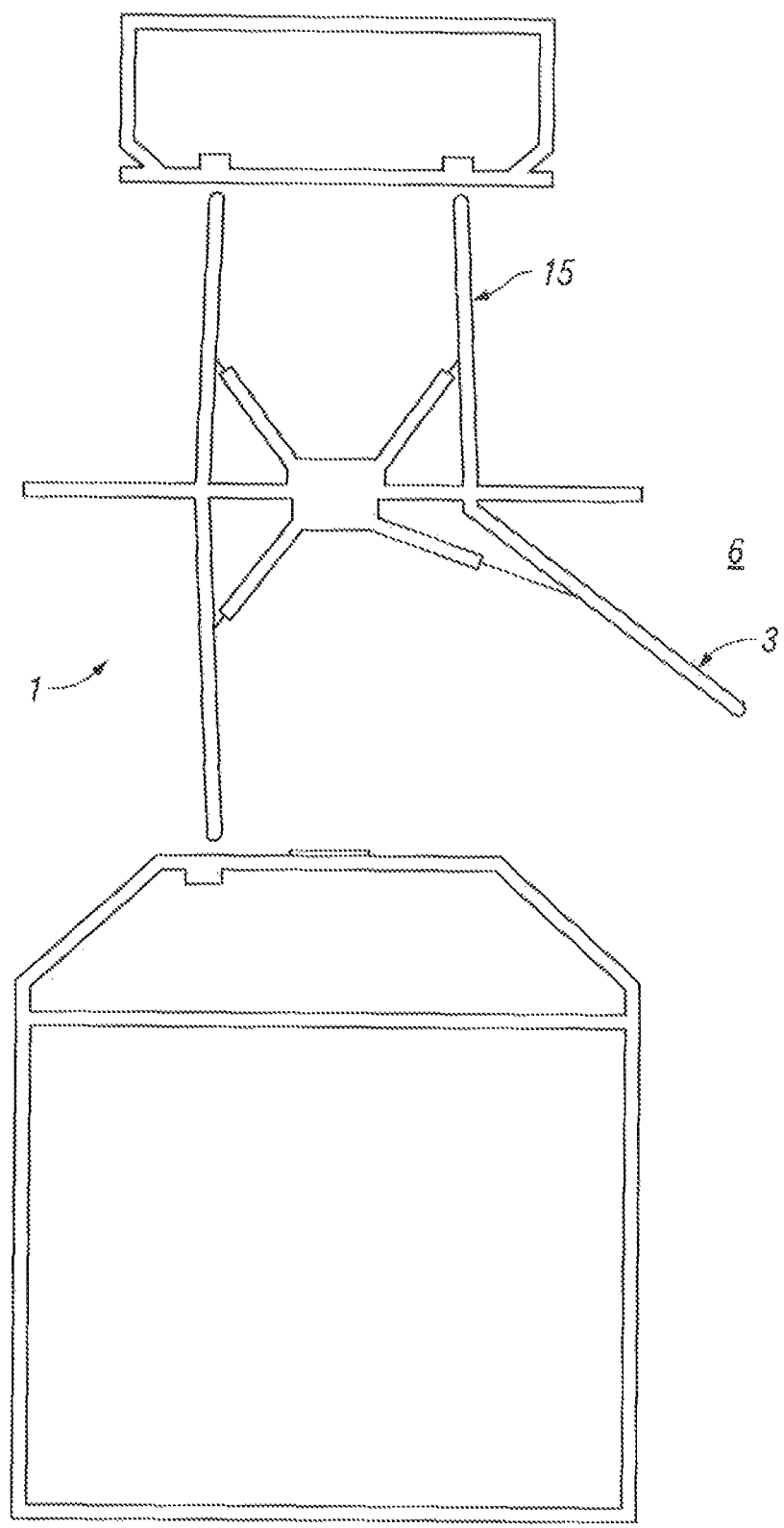
Figure 4:
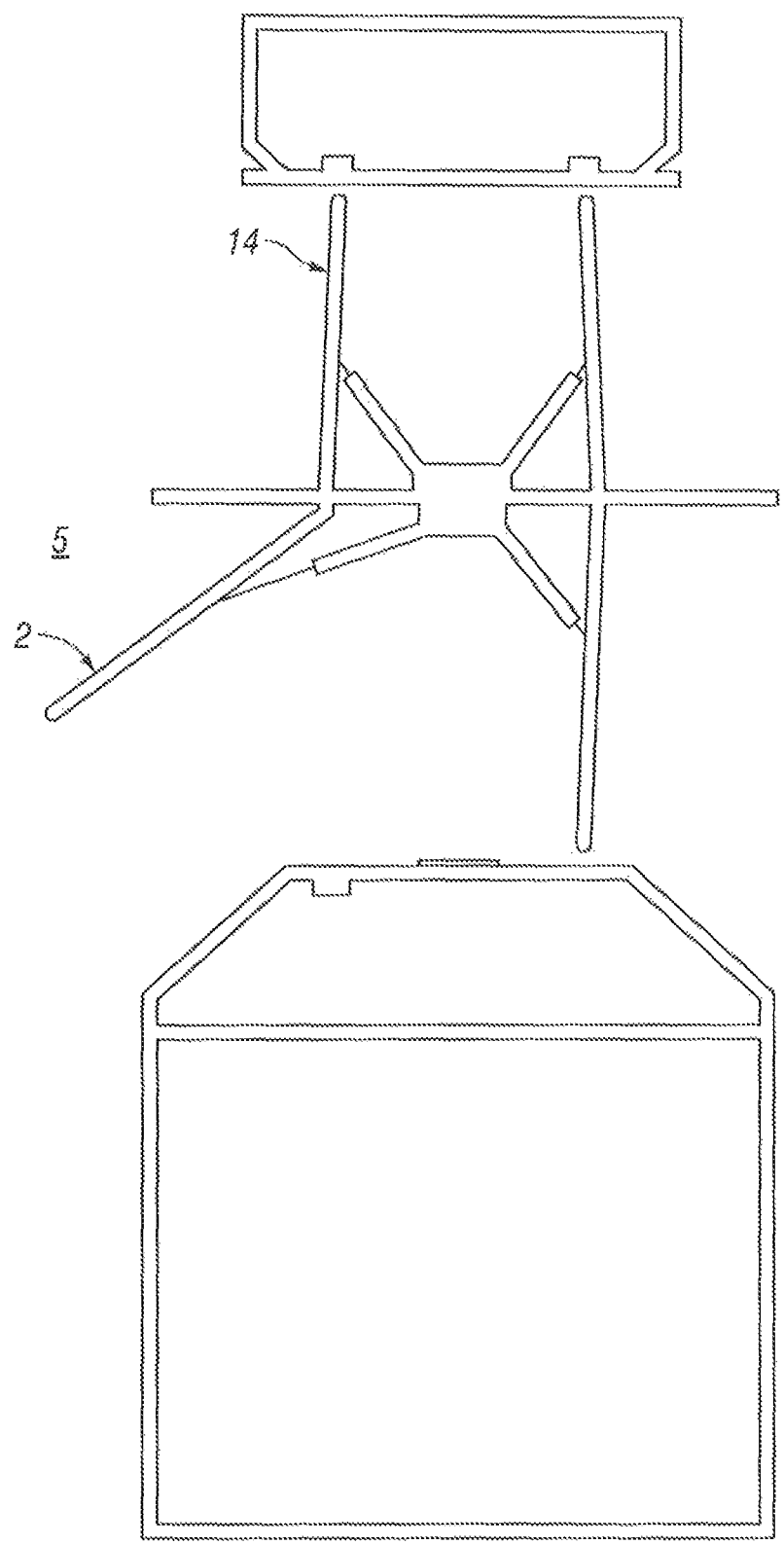

FIG. 2 and FIG. 4 respectively show that for entry of a cow into the milking box 1, either the entry fence 3 located at the second side 6, or the entry fence 2 that is located at the first side 6 may be operated.

Figure 3:
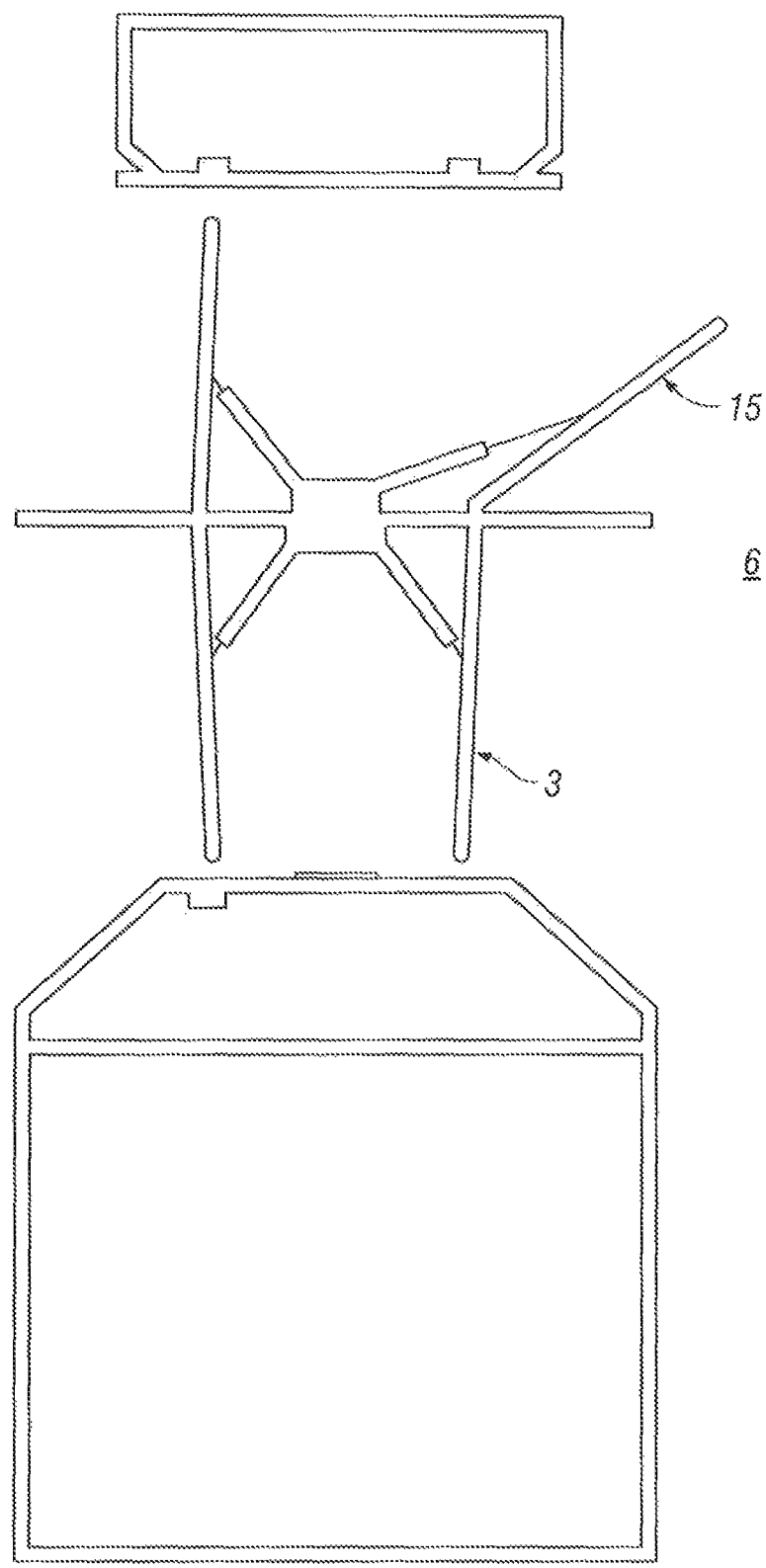
Figure 5:
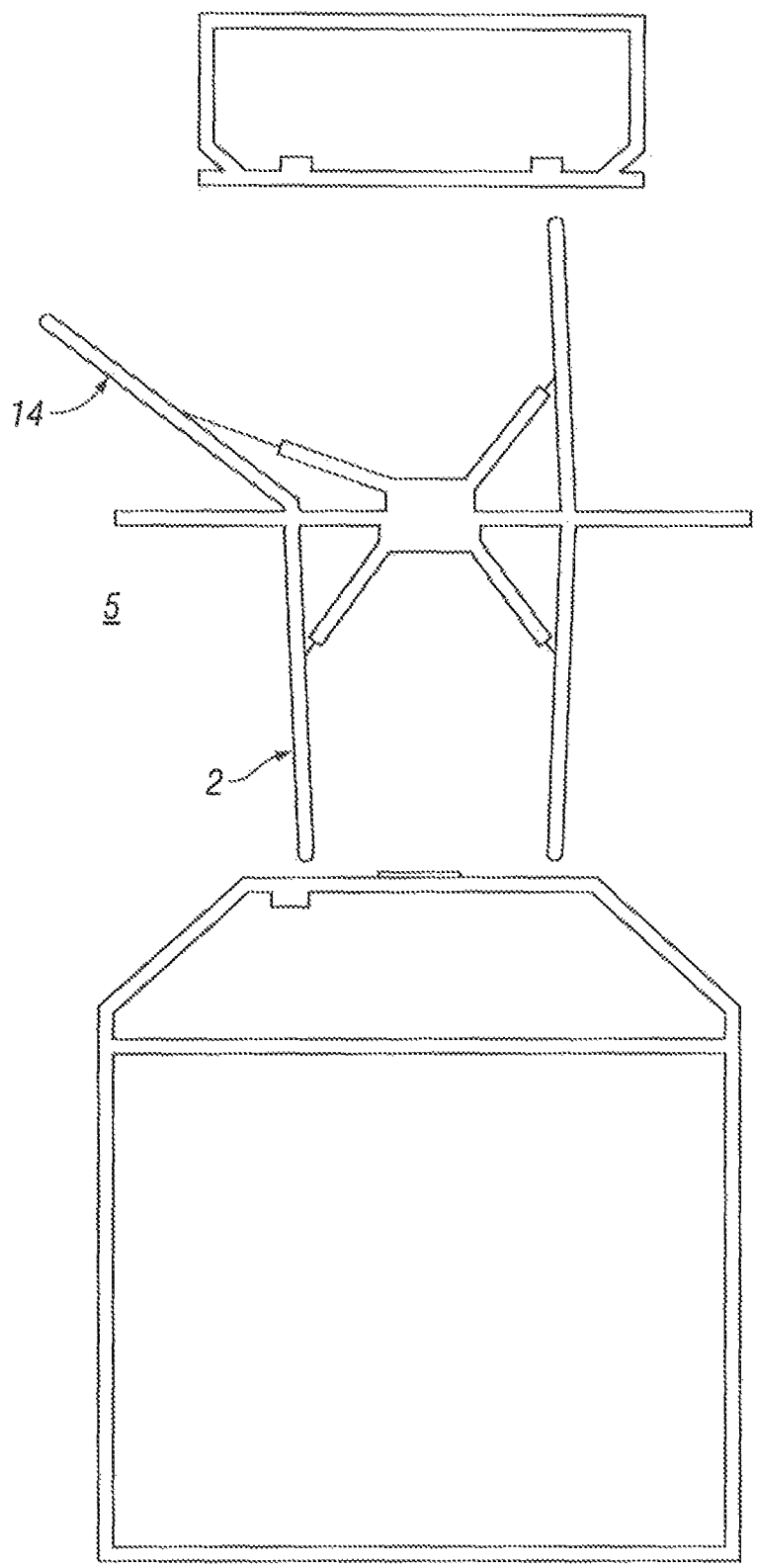

FIG. 3 and FIG. 5 respectively show that for having the cow leave the milking box 1, either the exit fence 15 at the second side 6, or the exit fence 14 that is located at the first side 5 may be operated.

It will be clear for the artisan that the side 5, 6 at which the cow enters the milk box 1 can be selected independent from the side 5, 6 at which the cow will leave the milk box 1. Consequently milk box 1 of the invention provides flexibility and versatility to any cow stable in which it is used, which is clearly demonstrated in the embodiments of the cow stable of the invention shown in the FIG. 6-FIG. 9.

Figure 6:
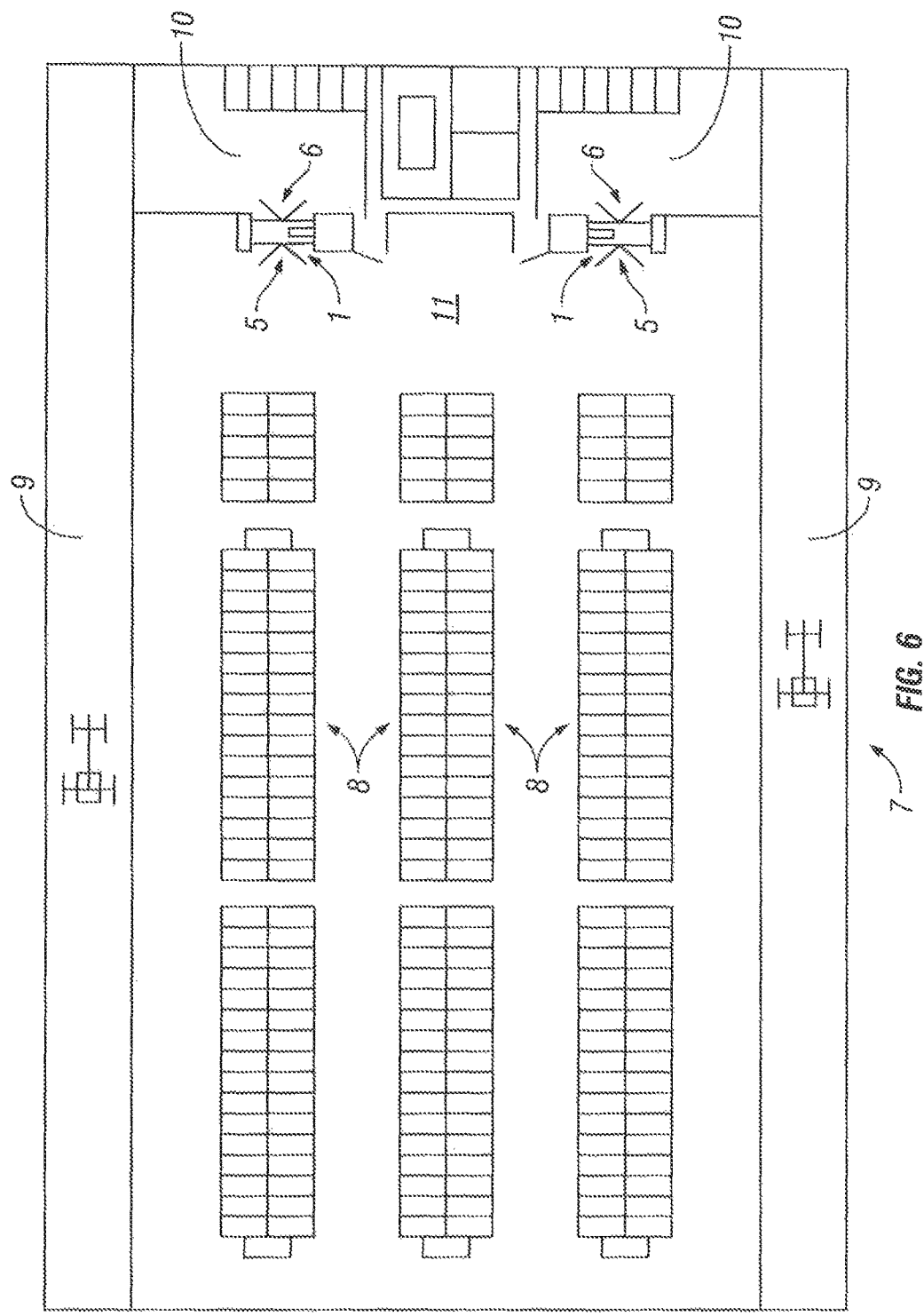

FIG. 6 shows a first embodiment of the cow stable 7 of the invention comprising resting boxes 8 for cows, milking boxes 1, at least one feeder trough 9, a separation zone or zones 10, and walking paths 11 allowing the cows to move between the resting boxes 8, milking boxes 1, the at least one feeder trough 9 and the separation zone or zones 10.

FIG. 6 clearly shows that in this embodiment but also in the embodiments to be discussed hereinafter with reference to the FIGS. 7-9, a milking box or boxes 1 according to the invention are applied. Further it is shown that at least the resting boxes 8 are placed at the first side 5 of the milking box or boxes 1, and that at the second side 6 of the milking box or boxes 1 the separation zone or zones 10 are located.

Figure 7:
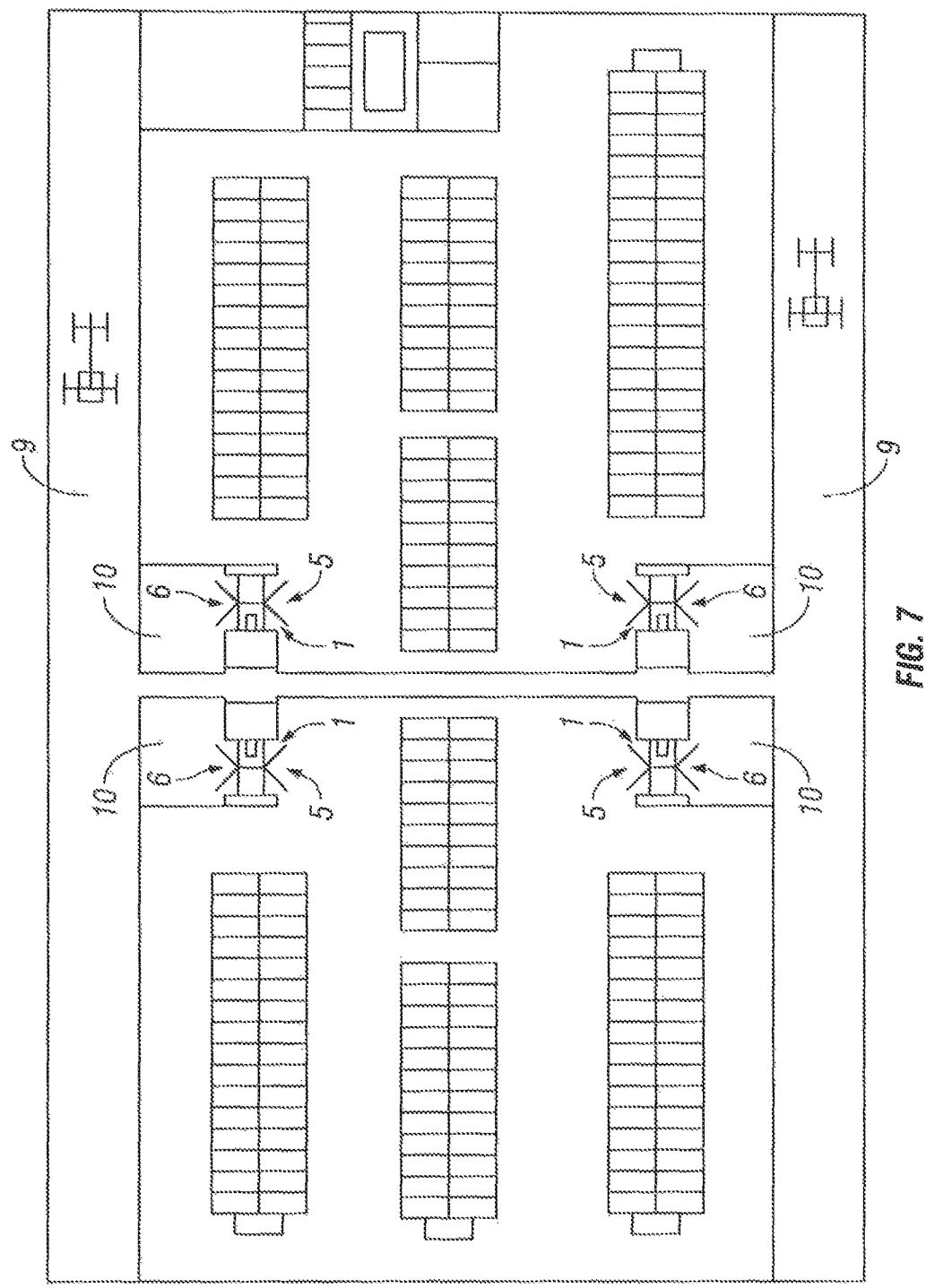

FIG. 7 shows a variation to the embodiment of FIG. 6, in which again at the second side 6 of the milking box or boxes 1 the separation zone or zones 10 are located. In this embodiment however the milking boxes 1 are placed approximately in the middle of the cow stable 7. Both the embodiment shown in FIG. 6 as the embodiment shown in FIG. 7 make it easy to selectively separate a cow which has entered the milking box 1 into a separation zone 10, and to have non-selected cows that leave the milking box 1 return to the part of the cow stable 7 from which they initially entered the milking box 1.

Figure 8:
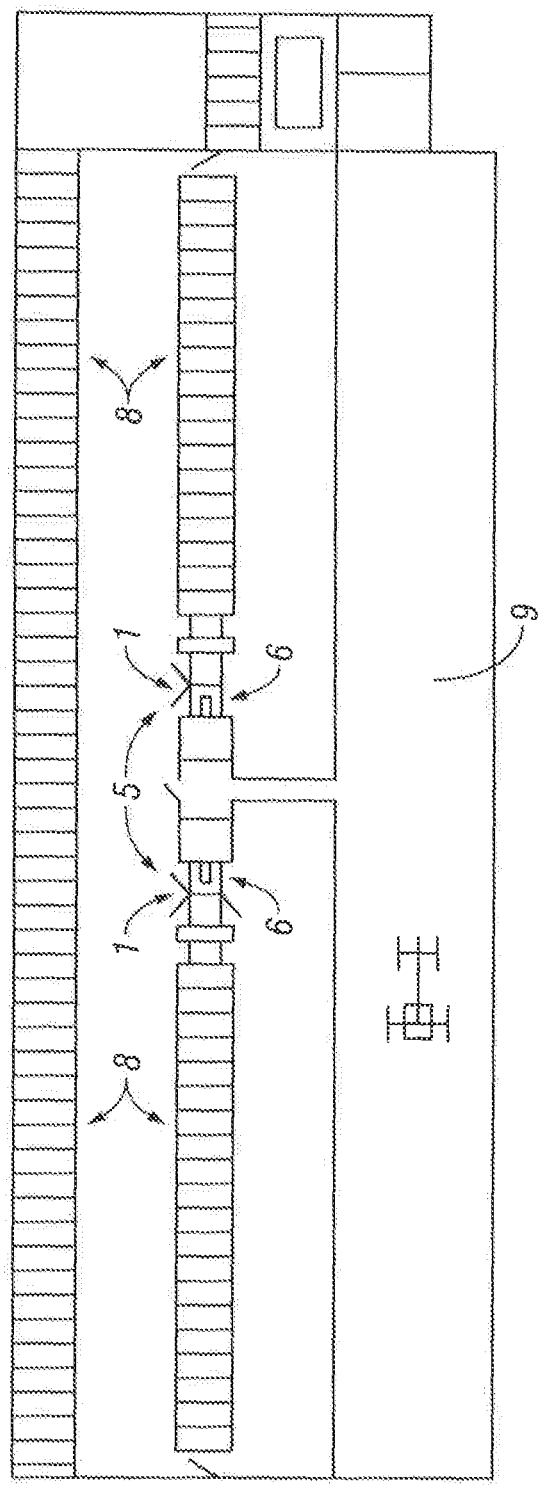

FIG. 8 shows a third embodiment of the cow stable 7 of the invention comprising resting boxes 8 for cows, milking boxes 1, and one feeder trough 9 which is placed at the second side 6 of the milking box 1. This construction makes it possible to secure that each cow that has entered the milking box 1 at its first side 5, leaves the milking box 1 after being milked at the second side 6 of the milking box 1, thus only then giving these cows access to the feeding trough 9.

FIG. 9 shows a fourth embodiment of the cow stable 7 of the invention comprising resting boxes 8 for cows, milking boxes 1, at least one feeder trough 9, and walking paths 11 allowing the cows to move between the resting boxes 8, milking boxes 1, and the at least one feeder trough 9. In this construction the milking boxes 1 are placed in one of the walls of the cow stable 7 so as to cause that at the second side 6 of the milking box or boxes 1 the cow stable's outdoors 12 is located. This is a very easy and effective means to control without much labor the movement of the cows between the stable 7 indoors and outdoors 12, making it also possible to selectively have particular cows remain indoors, and other cows being allowed outdoors.

Whenever the cows enter the milking box 1 again for another milking operation, another decision can be made whether or not the cow that has been milked may go outdoors or must further remain inside of the stable 7.

What is claimed is:

1. A stable, comprising:
   a first row of resting boxes;
   a second row of resting boxes positioned colinearly with but separated from the first row of resting boxes;
   a single milking box positioned between the first row of resting boxes and the second row of resting boxes, the single milking box comprising:
   two entrance fences and two exit fences for the single milking box;
   wherein a first entrance fence and a first exit fence form a first pair of fences positioned at a first side of the single milking box;
   wherein a second entrance fence and a second exit fence form a second pair of fences positioned at a second side of the single milking box which is opposite the first side;
   wherein the first entrance fence operates independently of the second entrance fence, the first exit fence, and the second exit fence;
   wherein the second entrance fence operates independently of the first entrance fence, the first exit fence, and the second exit fence;
   wherein the first exit fence operates independently of the first entrance fence, the second entrance fence, and the second exit fence;
   wherein the second exit fence operates independently of the first entrance fence, the second entrance fence, and the first exit fence;
   wherein a dairy livestock can enter the first entrance fence and have access to both the first exit fence and the second exit fence; and
   wherein the dairy livestock can enter the second entrance fence and have access to both the first exit fence and the second exit fence.

2. The stable of claim 1, wherein the single milking box is positioned transverse to at least one resting box in the first row of milking boxes.

3. The stable of claim 2, further comprising a second single milking box positioned colinearly with the first single milking box.

4. The stable of claim 3, wherein the second single milking box comprises a first entrance fence and a first exit fence on a first side of the second single milking box and a second entrance fence and a second exit fence on a second side of the second single milking box opposite to the first side.

5. The stable of claim 1, further comprising a feeder trough positioned parallel to the first row of resting boxes.

6. A stable, comprising:
   a first single milking box comprising a first entrance fence and a first exit fence on a first side of the first single milking box, and a second entrance fence and a second exit fence on a second side of the first single milking box opposite to the first side;
   wherein the first entrance fence operates independently of the second entrance fence, the first exit fence, and the second exit fence;
   wherein the second entrance fence operates independently of the first entrance fence, the first exit fence, and the second exit fence;
   wherein the first exit fence operates independently of the first entrance fence, the second entrance fence, and the second exit fence;
   wherein the second exit fence operates independently of the first entrance fence, the second entrance fence, and the first exit fence;
   wherein a dairy livestock can enter the first entrance fence and have access to both the first exit fence and the second exit fence;
   wherein the dairy livestock can enter the second entrance fence and have access to both the first exit fence and the second exit fence;
   a second single milking box positioned adjacent to and colinearly with the first single milking box;
   a resting box positioned adjacent to the first single milking box; and a walking path positioned between the resting box and the first single milking box.

7. The stable of claim 6, further comprising a feeder trough positioned parallel to a first row of resting boxes.

8. The stable of claim 6, wherein the first and second single milking boxes are positioned at the end of a plurality of rows of resting boxes and separated from the resting boxes by a walking path.

9. The stable of claim 6, wherein the first single milking box is positioned between a walking path on the first side and a separation zone on the second side.

10. The stable of claim 9, wherein:
the separation zone is a first separation zone; and
the second single milking box is positioned between the walking path and a second separation zone.

11. The stable of claim 6, wherein the second single milking box comprises a first entrance fence and a first exit fence on a first side of the second single milking box and a second entrance fence and a second exit fence on a second side of the second single milking box opposite to the first side.

12. A stable, comprising:
a plurality of rows of resting boxes;
positioned at the end of at least one row of resting boxes, at least one single milking box comprising a first entrance fence and a first exit fence on a first side of the single milking box and a second entrance fence and a second exit fence on a second side of the single milking box opposite to the first side, wherein the at least one single milking box is oriented parallel to at least one resting box in the at least one row of resting boxes;
wherein the first entrance fence operates independently of the second entrance fence, the first exit fence, and the second exit fence;
wherein the second entrance fence operates independently of the first entrance fence, the first exit fence, and the second exit fence;
wherein the first exit fence operates independently of the first entrance fence, the second entrance fence, and the second exit fence;
wherein the second exit fence operates independently of the first entrance fence, the second entrance fence, and the first exit fence;
wherein a dairy livestock can enter the first entrance fence and have access to both the first exit fence and the second exit fence;
wherein the dairy livestock can enter the second entrance fence and have access to both the first exit fence and the second exit fence; and
a walking path positioned between the end of the at least one row of resting boxes and the at least one single milking box.

13. The stable of claim 12, wherein the first side of the single milking box faces the end of the at least one row of resting boxes and further comprising a separation zone adjacent to the second side of the single milking box.

14. The stable of claim 12, wherein the single milking box comprises a first milking box and the stable further comprising a second milking box positioned at the end of a second row of resting boxes, wherein the second milking box is oriented parallel to at least one resting box in the second row of resting boxes.

15. The stable of claim 12, further comprising a feeder trough having a longitudinal axis that is parallel to at least one row of resting boxes.

16. The stable of claim 12, wherein the single milking box comprises a first milking box and the stable further comprising a second milking box positioned adjacent to the first milking box, wherein the first single milking box is arranged colinearly with the second single milking box.

17. The stable of claim 16, wherein the second milking box comprises a first entrance fence and a first exit fence on a first side of the single milking box and a second entrance fence and a second exit fence on a second side of the single milking box opposite to the first side.

18. The stable of claim 17, wherein the first and second milking boxes are positioned such that the first side of the first milking box is substantially parallel to the first side of the second milking box and the second side of the first milking box is substantially parallel to the second side of the second milking box.

19. The stable of claim 12, further comprising:
a feeder trough positioned adjacent to the second side of the single milking box; and
a separation zone positioned between the single milking box and the feeder trough.

20. The stable of claim 12, wherein the single milking box comprises a third side between the first side and the second side, and the third side of the single milking box faces the end of the at least one row of resting boxes.

* * * * *